United States Patent Office 3,330,664
Patented July 11, 1967

3,330,664
POLYMERIC HARDENERS FOR GELATIN
Louis M. Minsk and Hyman L. Cohen, Rochester, N.Y., assignors to Eastman Kodak Company, Rochester, N.Y., a corporation of New Jersey
No Drawing. Filed Oct. 13, 1965, Ser. No. 495,722
6 Claims. (Cl. 96—111)

This application is a continuation-in-part of our application Ser. No. 214,815 entitled Polymeric Hardeners for Gelatin, filed Aug. 6, 1962, now abandoned.

This invention relates to hardeners for gelatin either when used as such or when used as the carrier for silver halide in photographic emulsions. These hardeners are polymeric in form and contain both carboxyl and unsaturated hydrocarbon, aldehyde or maleimido-radicals.

Various hardeners for gelatin have been suggested such as in the preparation of photographic products. Many photographic products contain several gelatin layers in sandwich form and it is often desirable to differentially harden these layers to a different degree determined by the task that each layer is to perform. The simple organic hardeners are prone to migrate from layer to layer, hence, differential hardening is difficult to achieve. As a result of this migration, the various layers of the photographic products tend to harden equally.

One means of anchoring the hardening function in a compound to be used for this purpose has been to unite a radical or grouping of high molecular weight with a radical or grouping of lower molecular weight which exerts a hardening effect. In the present invention, the prevention of migration is achieved by the use of a polymeric hardener in the gelatin composition.

One object of our invention is to provide hardeners for gelatin which resist migration from the layer in which they are present to an adjacent layer. Another object of our invention is to provide polymeric hardeners for gelatin having a polymeric chain which acts as a ballast for hardening groupings attached thereto. A further object of our invention is to provide polymers in which a large number of hardening sites may be attached to the backbone of the hardener. A still further object of our invention is to provide polymeric hardeners which are suitable in aqueous systems such as those in which gelatin is normally used and which are compatible with gelatin both wet and dry. A still further object of our invention is to provide polymeric hardeners for gelatin containing both carboxyl groups and unsubstituted unsaturated hydrocarbon terminal radicals, aldehyde radicals or maleimido radicals. Other objects of our invention will appear herein.

We have found that polymeric hardeners having a polymeric backbone and substituents thereon which provide (1) carboxyl groups and (2) unsubstituted unsaturated hydrocarbon terminal groups, aldehyde groups or maleimido groups are resistant to migration from one gelatin layer to another. These polymers incorporated in gelatin or in compositions containing gelatin such as silver halide emulsions will provide the layers coated out therefrom with good resistance to melting and swell. The hardening agents in accordance with our invention have a hardening effect on gelatin when used therewith in almost any proportion but a proportion of at least 1% based, on the gelatin, is ordinarily most desirable. The optimum range for the use of the hardeners in gelatin compositions is ordinarily 5–10% based on the weight of the gelatin.

In its broadest aspects our invention relates to the use as hardeners for gelatin of polymers of which the linear portion is a linear polymeric chain having the structure of an addition polymer of the polyhydrocarbon type or the structure of a condensation polymer such as of a polypeptide for instance gelatine (recurring CO—NH units) of a polyanhydroglucose, for instance cellulose or of a polyamide, for instance nylon. The polymeric chain or backbone should have appended thereto reactive groups such as hydroxyl, amino, carboxy halide or anhydride through which the hardening groups are attached.

The hardeners in accordance with our invention are polymers having substituents on the recurring units supplying carboxyl and unsubstituted unsaturated hydrocarbon terminal groups, aldehyde radicals or maleimido groups. It is desirable that these hardeners have a carboxyl content of at least 3% to insure water solubility and compatibility with gelatin. They should also have at least 2% of unsubstituted unsaturated hydrocarbon groupings, aldehyde radicals or maleimido groups or combinations thereof in chemical combination in the polymer. Polymers having the above-described characteristics are useful as non-migrating hardeners for gelatin.

Some compounds which will illustrate hardeners of this type are the following:

A. Copoly(ethylene - N - aldehydomethyl maleamic acid)

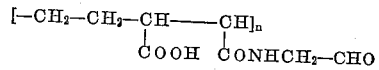

$n$ being at least 20.

B. Copoly(ethylenemaleic acid - maleimidomethyl acid maleate)

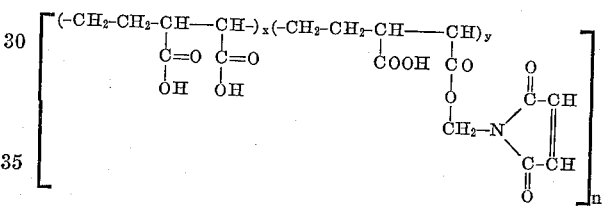

$n$ being at least 20 and $x$ and $y$ are 1 to 5.

C. Copoly(ethylene-beta-maleimidoethyl acid maleate)

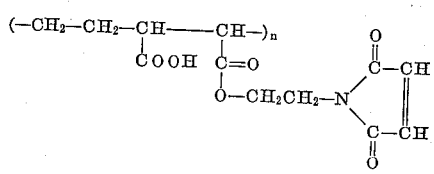

$n$ being at least 20.

D. Copoly(acrylic acid-beta-maleimidoethyl acrylate)

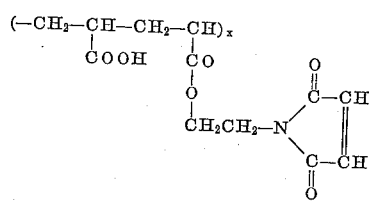

$x$ being at least 20.

E. Copoly(vinyl alcohol-vinyl acrylate-vinyl acetate-vinyl acid succinate)

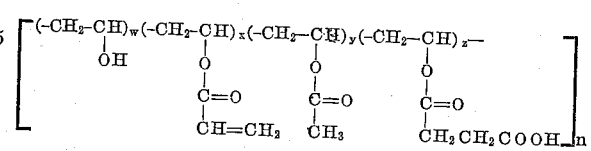

where $x$, $w$, $y$ and $z$ are integers within the range 1–5 and $n$ is at least 20.

F. Copoly(vinyl acryloxyethylcarbamate-vinyl acid succinate)

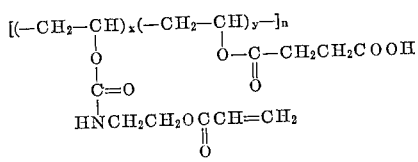

$x$ and $y$ being 1–5 and $n$ is at least 20.

G. Copoly(ethylene - beta - vinylsulfonylethyl acid maleate)

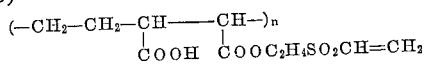

$n$ being at least 20.

In the compounds listed above where ethyl or methyl is a substituent it is to be understood that the other or another alkyl particularly an alkyl of 1–4 carbon atoms may be the substituent instead and that the resulting compound is a gelatin hardener in accordance with the invention.

Samples of the various compounds listed above were added to separate portions of a high speed gelatin-silver bromoiodide photographic emulsion which had been panchromatically sensitized with a cyanine dye. The emulsion used contained 245 grams of gelatin per mole of silver halide. Each emulsion sample was coated on a cellulose acetate support at the rate of 430 mg. of silver per square foot. The coatings were compared with controls without hardener. A sample of each coating was exposed on an Eastman 1B sensitometer, processed for 5 minutes in Kodak DK–50 developer, fixed, washed and dried. The results obtained were as follows:

| Hardener | G./100 g. of gelatin | Rel. Speed | γ | Fog | Melting Point, °F. | Swell |
|---|---|---|---|---|---|---|
| Control | | 100 | 1.13 | 0.12 | 84 | 772 |
| B | 3.6 | 91 | 1.12 | 0.10 | 86 | 787 |
| B | 7.2 | 78 | 1.13 | 0.08 | 141 | 511 |
| B | 14.4 | 73 | 1.15 | 0.09 | 177 | 492 |
| E | 3.6 | 94 | 1.12 | 0.10 | 212 | 382 |
| E | 7.2 | 95 | 1.13 | 0.10 | >212 | 327 |
| E | 14.4 | 102 | 1.13 | 0.10 | >212 | 254 |
| Control | | 100 | 1.20 | 0.12 | 84 | 769 |
| G | 5.0 | 89 | 0.90 | 0.22 | >212 | 414 |
| G | 10.0 | 69 | 0.68 | 0.40 | >212 | 282 |
| Control | | 100 | 1.08 | 0.11 | 88 | 657 |
| A | 5.0 | 95 | 0.97 | 0.15 | 93 | 470 |
| A | 10.0 | 83 | 0.80 | 0.26 | 183 | 327 |
| Control | | 100 | 1.20 | 0.13 | 86 | 698 |
| C | 5.0 | 74 | 0.83 | 0.12 | >212 | 379 |
| C | 10.0 | 89 | 1.07 | 0.16 | >212 | 410 |
| Control | | 100 | 0.98 | 0.13 | 86 | 622 |
| D | 5.0 | 91 | 0.97 | 0.15 | >212 | 533 |
| D | 10.0 | 89 | 0.92 | 0.18 | 157 | 447 |
| Control | | 100 | 1.24 | 0.14 | 86 | 860 |
| F | 5.0 | 91 | 1.18 | 0.14 | 96 | 376 |
| F | 10.0 | 94 | 1.18 | 0.13 | >212 | 252 |

The lower speeds in the emulsions which had been hardened appears to be due to some slowing down of the development rate as hardening action in general, does decrease the permeability of an emulsion layer to developer solution.

Examples of preparing polymeric hardeners useful in compositions of the invention are as follows:

*Example 1.—Copoly(ethylene-N-aldehydomethyl maleamic acid)*

A solution of 10 grams (0.08 mole) of ethylene-maleic anhydride copolymer in 100 ml. of acetone was tumbled for 3 days with 10.8 grams (0.08 mole) of aminoacetaldehyde diethyl acetal. The viscosity of the solution increased markedly. The product was precipitated in ether, washed with ether and vacuum dried giving 20 grams of product. This polymeric product was dissolved in a mixture of 200 ml. of water and 200 ml. of dimethylformamide and the solution was tumbled with 50 grams of ion exchange resin (Amberlite IR 120) for 3 days. The solution was filtered and the filtrate was added to 750 ml. of water containing 2 grams of sodium hydroxide. The solution was dialyzed overnight and was then evaporated down to 100 ml. and used for addition to gelatin compositions for hardening purposes. This product had an ethoxyl content of 20.7% and a nitrogen content of approximately 5%, based on the weight of the entire product.

*Example 2.—Copoly(ethylene-maleimidomethyl acid maleate)*

A solution of 10 grams (0.8 mole) of an ethylene-maleic anhydride copolymer in 150 ml. of dimethylformamide was mixed with 10 grams (0.8 mole) of N-hydroxymethylmaleimide. The mixture was heated for 2 hours on a steam pot and was then precipitated in ether. The product was washed and vacuum dried and there resulted 10 grams of copoly(ethylene-maleimidomethyl acid maleate) in the form of a fibrous, white solid. The reaction went to 25% of completion and the product had 2.2% nitrogen content.

*Example 3.—Copoly(ethylene-beta-maleimidoethyl acid maleate)*

6.3 grams of ethylene-maleic anhydride interpolymer which had been heated at 120° C. under vacuum overnight was placed in a glass reflux outfit equipped with a mechanical stirrer. Eight grams of beta-hydroxyethylmaleimide, 50 ml. of hexamethylphosphoramide, 6.5 ml. of dry pyridine, and a small amount of hydroquinone were added and the mass was heated and stirred on a steam bath for 40 minutes to form a derived polymer. The dope obtained was cooled and poured into two liters of ether in a fine stream thereby precipitating the polymer formed. The product was extracted with ether and dried in a vacuum desiccator to give 10 grams of product. Eight grams of the thus obtained product was suspended in 50 ml. of distilled water, chilled in an ice bath and mechanically stirred, and 10% aqueous sodium hydroxide was added dropwise, keeping the pH below 7 throughout. Solution was complete with the final pH at 6.4. The weight was adjusted to 80 grams, making the solids content 10%.

*Example 4.—Copoly(acrylic acid-beta-maleimidoethyl acrylate)*

Poly acrylic anhydride (rather than ethylene-maleic anhydride polymer), beta-hydroxyethylmaleimide, hexamethylphosphoramide, pyridine, and hydroquinone in the amounts given in the preceding example were mixed together and treated in an identical manner. The yield of the product was 10.3 grams. Seven grams of this product was doped in 35 ml. of distilled water in the manner described in the previous example maintaining the pH below 6.4. 72 grams of dope at pH 6.3 was obtained having a content of 9.7%, of copoly(acrylic acid-beta-maleimidoethyl acrylate).

*Example 5.—Copoly(ethylene-beta-vinylsulfonylethyl acetate-vinyl acid succinate)*

22 grams of polyvinyl alcohol containing about 12 mole percent of combined vinyl acetate were dissolved in 220 ml. of hexamethylphosphoramide by heating to 150° C. The clear smooth dope was cooled to 50° C. and a small amount of hydroquinone and then 20 ml. of acryly chloride were added. The reaction vessel was placed in a 50° C. bath and after one hour at this temperature 100 ml. of pyridine and 50 grams of succinic anhydride were added and the temperature was raised to 60° C. The mass was kept at 60° C. for 21½ hours. The resulting dope was diluted with an equal volume of water and poured in a fine stream into 10 liters of acetone with stirring. The precipitate obtained was extracted with acetone and was then dissolved in 250 ml. of water. 338 grams of dope having a solids content of 13.4% was obtained determined by drying a weighed sample at 110° C. and weighing the residue. The polymer obtained contained 27.1% of combined vinyl acid succinate.

*Example 6.—Copoly(ethylene-beta-vinylsulfonylethyl acid maleate)*

6.8 grams of vinyl hydroxyethyl sulfone was mixed with 6.2 grams of a medium viscosity ethylene-maleic anhydride copolymer, 4 grams of pyridine, 20 mg. of hydroquinone and 70 ml. of distilled hexamethylphosphoramide and the mass was heated for one hour on a steam pot. A dark solution resulted which was cooled and poured into ether. The precipitate obtained was washed and vacuum dried. The yield was 12 grams of a light purple solid which was copoly(ethylene-vinylsulfonylethyl acid maleate). Analysis gave a sulfur content of 10.6%.

*Example 7.—Copoly(ethylene-mucochloryl acid maleate)*

25.2 grams of ethylene maleic anhydride copolymer and 33 grams of mucochloric acid were dissolved in 250 ml. of dimethylformamide and the solution was heated for one hour on a steam bath. The mixture turned dark. It was precipitated in ether, washed, redissolved in acetone, and reprecipitated in ether, washed and vacuum dried. A yield of 23 grams of copoly(ethylene-mucochloryl acid maleate) was obtained.

*Example 8.—Copolymer of N-acrylyl-O-mucochloryl carbamatemaleic anhydride*

A solution of 50 grams of mucochloric acid and 100 ml. of acetone was added dropwise with ice cooling to a solution of 30 grams of acrylyl isocyanate in 100 ml. of ether under nitrogen. The mass was allowed to stand overnight whereupon a crystalline solid precipitated. Upon cooling in a freezer and filtering, 16 grams of crude product was obtained. This product was recrystallized from acetone giving 12 grams of white needles of N-acrylyl-O-mucochloryl carbamate (M.P. 161–162° C.).

8 grams of the N-acryly-O-mucochloryl carbamate so prepared and 3.8 grams of maleic anhydride were dissolved in 200 ml. of benzene and the solution was heated with 0.2 gram of benzoyl peroxide on a steam pot. The mixture started to polymerize almost immediately. The mass was heated for 4 hours then the mass was cooled, filtered, washed with benzene, and vacuum dried. A copolymer of acrylyl mucochloryl carbamate and 25 mole percent of maleic anhydride was thereby obtained ($\eta=0.11$) which product had good gelatin hardening properties.

*Example 9.—Beta-acrylyloxyethyl carbamyl gelatin*

A mixture of 15 grams of gelatin and 300 ml. of dry dimethyl sulfoxide was tumbled for four days. Most of the gelatin went into solution. After filtering, there was added to the filtrate 1.5 grams of isocyanatoethyl acrylate and the resulting solution was allowed to stand overnight. It was then heated for one hour in a 60° bath. The product was precipitated in acetone, washed, and vacuum dried. 12 grams of beta-acrylyloxyethyl carbamyl gelatin was obtained.

*Example 10.—Acrylyl carbamyl gelatin*

A solution of 10 grams of gelatin and 200 ml. of dimethyl sulfoxide was made as in the previous example. This was treated with 4 grams of acrylyl isocyanate. The solution was allowed to stand overnight and was then precipitated in acetone, giving a white powder. 6.4 grams of acrylylcarbamyl gelatin was obtained.

Samples of the compounds prepared by Examples 7, 8, 9, and 10 were added to separate portions of a high speed silver bromoiodide emulsion which had been panchromatically sensitized with a cyanine dye. Each emulsion was coated on cellulose acetate film support at a silver coverage of 432 mg. per square foot and a gelatin coverage of 980 mg. per square foot. The coatings were compared with controls without hardener. Each coating was exposed on an Eastman 1B sensitometer, processed for 5 minutes in Kodak DK–50 developer, fixed, washed and dried. The results obtained were as follows:

| Product Example | Conc., g./100 g. of gel | Rel. Speed | Gamma | Fog | Percent Swell [1] (Vert.) | ° F. Ret. | ° F. M.P. |
|---|---|---|---|---|---|---|---|
| Control | | 100 | 1.34 | 0.09 | 652 | 79 | 85 |
| Example VIII | 1 | 80 | 1.11 | 0.12 | 581 | 82 | 91 |
|  | 5 | 80 | 1.02 | 0.14 | 339 | None | >212 |
|  | 10 | 67 | .94 | 0.14 | 216 | None | >212 |
| Example VII | 1 | 87 | 1.30 | 0.08 | 678 | 79 | 89 |
|  | 5 | 73 | 1.32 | 0.08 | 568 | 79 | 89 |
|  | 10 | 68 | 1.21 | 0.07 | 503 | 79 | 83 |
| Control | | 100 | 1.58 | 0.13 | 863 | 80 | 87 |
| Example IX | 1 | 105 | 1.60 | 0.13 | 632 | 94 | 125 |
|  | 5 | 87 | 1.49 | 0.11 | 640 | None | >212 |
|  | 10 | 83 | 1.33 | 0.10 | 348 | None | >212 |
| Example X | 1 | 105 | 1.52 | 0.13 | 776 | 78 | 83 |
|  | 5 | 105 | 1.30 | 0.20 | 596 | 83 | 89 |
|  | 10 | 80 | 1.34 | 0.24 | 385 | 86 | 102 |

[1] Vertical swell was determined after the strip had been immersed at 68° F. in distilled water.

The hardeners in accordance with our invention are of special value for use in photographic products in which a plurality of gelatin layers are applied one over the other because of their resistance to migration from layer to layer. The photographic products may employ various types of supports such as cellulose ester film, film of other types or paper supports, the type of support used being optional with the individual operator. In addition to the hardening of photographic emulsion layers, also contemplated is the hardening of gelatin layers employed as over-coatings, subcoats, antistatic layers, antihalation layers or the like which layers may contain pigments, dyes or any of the other addenda which have been incorporated in gelatin layers in the making of photographic products.

The invention has been described in considerable detail with particular reference to certain preferred embodiments thereof, but it will be under stood that variations and modifications can be effected within the spirit and scope of the invention as described hereinabove, and as defined in the appended claims.

We claim:

1. A composition of matter comprising gelatin containing an effective hardening amount of a compound selected from the group consisting of acrylyl carbamyl gelatin and beta-acrylyloxyethyl carbamyl gelatin.

2. A composition of matter comprising gelatin containing as a hardener therein an effective hardening amount of beta-crylyloxyethyl carbamyl gelatin.

3. A composition of matter comprising gelatin containing as a hardener therein an effective hardening amount of

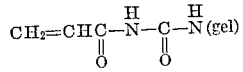

4. A gelatin-silver halide photographic emulsion, the vehicle of which comprises gelatin which emulsion contains therein an effective hardening amount of a gelatin hardener compound defined in claim 1.

5. A photographic emulsion, the vehicle of which comprises gelatin which emulsion contains as a hardener therein an effective hardening amount of beta-acrylyloxyethyl carbamyl gelatin.

6. A photographic emulsion, the vehicle of which comprises gelatin which emulsion contains as a hardener therein an effective hardening amount of

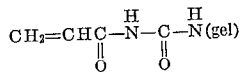

References Cited

UNITED STATES PATENTS 3,255,000   6/1966   Gates _____ 96—111

NORMAN G. TORCHIN, *Primary Examiner.*

J. RAUBITSCHEK, *Assistant Examiner.*